United States Patent [19]

Sakata et al.

[11] Patent Number: 5,497,243
[45] Date of Patent: Mar. 5, 1996

[54] VIDEO DISK RECORDER HAVING A REAL-TIME EDITING FUNCTION

[75] Inventors: Haruyasu Sakata; Nobuo Haino; Yoshihiro Utsumi, all of Tokorozawa, Japan

[73] Assignee: Pioneer Electronic Corporation, Tokyo, Japan

[21] Appl. No.: 187,480

[22] Filed: Jan. 28, 1994

[30] Foreign Application Priority Data

Feb. 1, 1993 [JP] Japan ................................ 5-015001

[51] Int. Cl.$^6$ ........................... H04N 5/781; G11B 5/596; G11B 7/00; G11B 15/18
[52] U.S. Cl. ..................... 358/342; 360/72.2; 360/78.14; 369/32; 369/44.28
[58] Field of Search ................................... 358/342, 322; 369/32, 44.28, 44.39; 360/71, 72.1, 72.2, 78.04, 78.14; H04N 5/781, 9/89

[56] References Cited

U.S. PATENT DOCUMENTS

| | | | |
|---|---|---|---|
| 4,516,166 | 5/1985 | Tellone | 360/72.1 |
| 4,688,116 | 8/1987 | Takahashi et al. | 360/72.2 |
| 5,214,626 | 5/1993 | Satoh et al. | 369/32 |
| 5,343,453 | 8/1994 | Ogino | 369/32 |
| 5,355,353 | 10/1994 | Kaiho | 369/32 |
| 5,375,106 | 12/1994 | Kawachi et al. | 369/32 |

*Primary Examiner*—Thai Q. Tran
*Attorney, Agent, or Firm*—Sughrue, Mion, Zinn, Macpeak & Seas

[57] ABSTRACT

A video disk recorder for executing a real-time edition records desired scenes to a disk while allowing an operator to observe a relay video image that is currently in progress. In response to the generation of a recording command signal, a recording head is set to a recording mode and a disk address of the recording head at that time is stored as a determinate disk address. In response to the generation of a stop command signal, the recording mode is canceled and a disk address of the recording head at that time is stored as a temporary disk address. In the case where a skip command signal is generated during the recording mode, the recording head is moved to the determinate disk address stored at the time of the start of the recording mode. In the case where the skip command signal is generated in a mode other than the recording mode, the recording head is moved to the temporary disk address.

2 Claims, 10 Drawing Sheets

FIG. 10E

VIDEO DISK RECORDER HAVING A REAL-TIME EDITING FUNCTION

BACKGROUND OF THE INVENTION

1. Field of the Invention

The invention relates to a video disk recorder and, more particularly, to a video disk recorder for selectively recording only desired scenes while a relay video image is being displayed for the purpose of confirmation.

2. Description of Related Art

For example, in television news programs of the day's sports events, certain important scenes are replayed as a highlight scene. It is impossible to forecast the time when such an important scene will occur in the relay broadcast of a baseball or the like. To replay such a scene, therefore, an editing work is performed such that the recording operation of such relay video images is continued from the beginning to the end and all of the game contents are recorded to a video tape or the like and, after completion of the game, scenes to be replayed are selected while reproducing the recorded video tape (master tape) and the selected scenes are sequentially recorded onto the video tape for the highlight scenes. With this scheme, desired replay scenes can be promptly reproduced from the video tape for the highlight scenes.

However, generally two or more hours are expended for almost all of the baseball games, and the recording to the master tape is executed for a long time. This has been causing a problem that a large amount of labors are expended for the editing operation for selecting some of desired scenes to be replayed from among the recorded scenes of a long time.

The method described above is a method in which the master tape to record all of the relay video images has been prepared beforehand, then desired scenes are selected from the master tape. It is, however, also conceivable to adopt the following method in which only desired scenes are selected and recorded while recording the relay video images to the master tape by using a VDR (Video Disk Recorder).

In the method in which only a desired scenes are selected and recorded while recording the relay video images to the master tape, by using the VDR, a desired scene can be selected while confirming the relay video images, so that an editing operation amount for the selection can be remarkably reduced as compared with the method whereby the master tape to record all of the relay video images is previously formed and, subsequently desired scenes are selected from the master tape.

The method mentioned above, however, has the following problems.

Namely, the operations for such a method are complicated because various operation commands must be generated after the set of cue numbers. Particularly, it requires busy editing operations such that the scenes recorded on the disk are again confirmed while generating a command to record desired scenes to the disk while observing the relay video image that is currently in progress, an extremely large operation load is imposed on the user.

OBJECTS AND SUMMARY OF THE INVENTION

The present invention has been made in view of the problems described above, and it is an object of the invention to provide a video disk recorder which can reduce an operation load to the user by improving an operating efficiency in executing busy editing operations such that the scenes recorded on a disk are confirmed by the user once more, wherein the user commands the recording of a desired scene to the disk while viewing a relay video image which is in progress.

According to the invention, there is provided a video disk recorder having a real-time editing function comprising:

recording means including moving means for moving a recording head in the radial direction of a rerecordable disk, for recording a video signal to the disk through the recording head;

reading means for reading an address on the disk of the recording head;

control means for performing the operations of: setting the recording head to the recording mode and the address is stored as a determinate disk address in response to the generation of a recording command signal; canceling the recording mode and storing the address as a temporary disk address in response to the generation of a stop command signal; in a case where a skip command signal is generated in the recording mode, moving the recording head to the determinate disk address stored at the start of the recording mode; and in cases where the skip command signal is generated in a mode other than the recording mode, moving the recording head to the temporary disk address.

According to the video disk recorder having the real-time editing function of the invention, in response to the generation of the recording command signal, the recording head is set into the recording mode and the disk address of the recording head at that time is stored as a determinate disk address, and in response to the generation of the stop command signal, the recording mode is canceled and the disk address of the recording head is stored as a temporary disk address, and in a case where the skip command signal is generated in the recording mode, the recording head is moved to the stored determinate disk address at the start of the recording mode, and in cases where the skip command signal is generated in a mode other than the recording mode, the recording head is moved to the temporary disk address.

DETAILED DESCRIPTION OF THE EMBODIMENT

Prior to explaining the embodiment of the invention, a method of selecting and recording only a desired image plane while recording relay video images to a master tape by using a VDR (Video Disk Recorder) will now be described with reference to the drawings.

Figure 1:
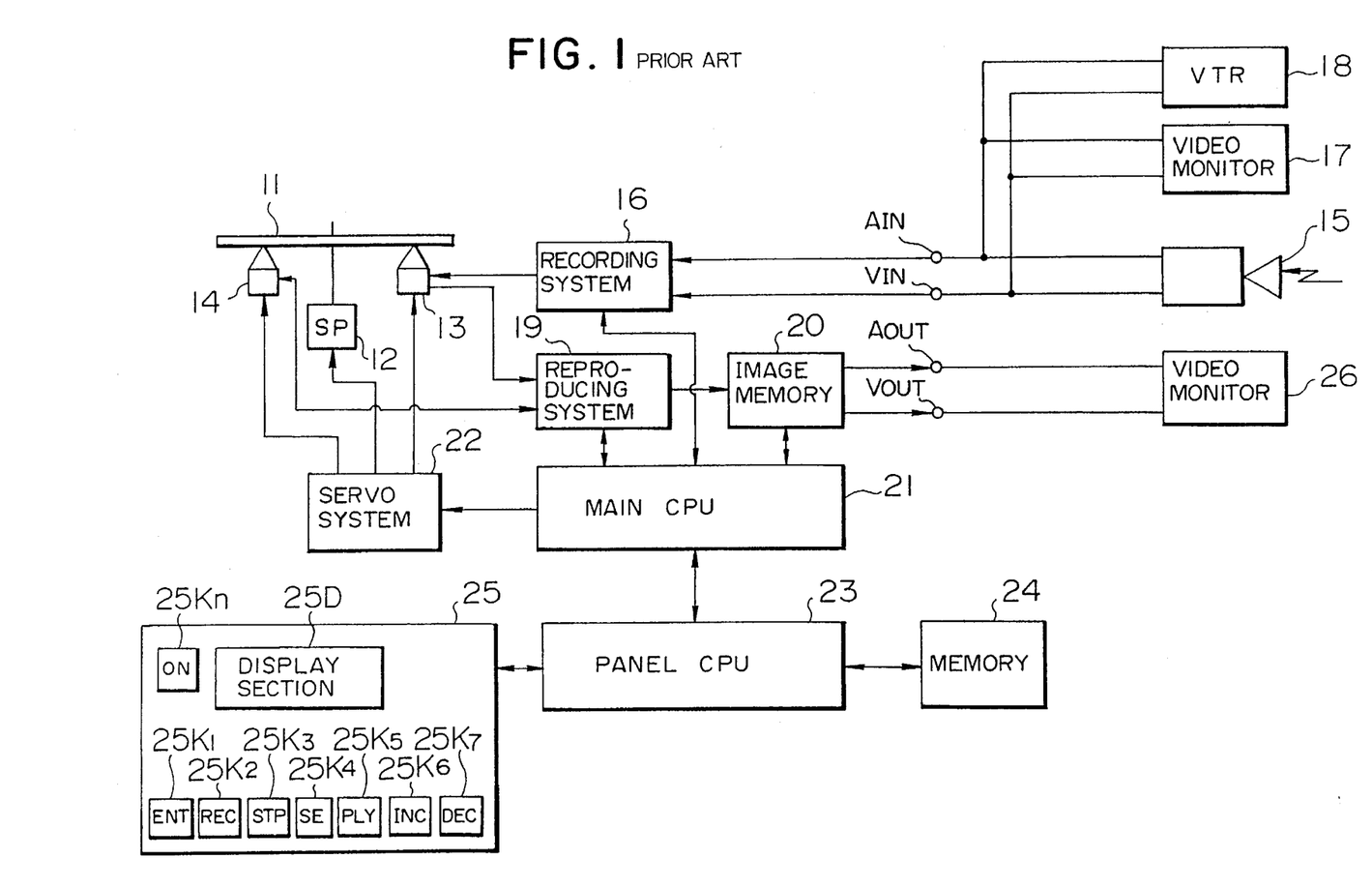
FIG. 1 is a block diagram showing a system which is constructed by a VDR and its peripheral apparatuses in order to realize a conventional method of selecting a desired scene while recording relay video images.

FIG. 1 is a block diagram showing a system which is constructed by such a VDR and its peripheral apparatuses.

In the diagram, a disk 11 is a well-known magnetooptic disk which is re-writable and reproducible at least a million times by using a magnetooptic effect. The disk 11 is rotated by a spindle motor 12. The recording, erasing, and reproducing (reading) operations of information of the disk 11 are executed by a recording/reproducing head 13 and an erasing/reproducing head 14. When an information signal is recorded, the erasing/reproducing head 14 enables a pseudo overwriting to the disk 11 by erasing the information signal on a track to be recorded while preceding to the recording/reproducing head 13. The disk 11 has been preformatted together with an address indicative of a recording position (for example, distance information from a recording start edge) on the disk. The heads 13 and 14 can read various kinds of recording information signals including a preformat signal on the disk and can access at a high speed on the basis of the preformatted addresses, respectively.

An output video signal of a video camera 15 is supplied to a recording system 16 through a video input terminal $V_{IN}$ and is also supplied to a video monitor 17 and a VTR (Video Tape Recorder) 18. The output audio signal of the video camera 15 is supplied to the recording system 16 through an audio input terminal $A_{IN}$ and is also supplied to the VTR 18. The recording system 16 modulates the video signal and audio signal which are supplied on the basis of a predetermined modulating method and supplies the modulated video signal and audio signal to the recording/reproducing head 13 as a recording signal. The head 13 changes an optical output level to the disk 11 in accordance with the recording signal which is supplied. The information signals read out from the disk 11 by the heads 13 and 14 are supplied to a reproducing system 19. The reproducing system 19 demodulates the read information signal which is supplied and writes the demodulated read information signal into an image memory 20 as a video signal and an audio signal. The video signal is read out from the image memory 20 and is supplied to a video output terminal $V_{OUT}$. The audio signal is read out from the image memory 20 and is supplied to an audio output terminal $A_{OUT}$.

The modulation processing control of the recording system 16, the reproduction processing control of the reproducing system 19, and the writing an reading controls of the image memory 20 are executed in cooperation with a main CPU 21. The main CPU 21 executes various kinds of operation controls according to a state of each servo and a control signal which is generated from a panel CPU 23 for a servo system 22. The servo system 22 executes a focusing servo and a tracking servo of the heads 13 and 14, a slider servo for moving each of the heads 13 and 14 in the radial direction of the disk, and a spindle servo of the spindle motor 12.

The panel CPU 23 is equipped with a memory 24 to store cue numbers, which will be explained hereinafter, as necessary. The panel CPU 23 decodes a command signal from the panel 25 as an operating section of the system and supplies a control signal corresponding to the decoding result to the main CPU 21. In addition to a display section 25D, the panel 25 is provided with a plurality of command keys $25K_1, 25K_2, \ldots, 25K_n$ (n: the number of command keys) each of which generates a corresponding command signal by being depressed. In the embodiment, the command keys are allocated as follows.

| | |
|---|---|
| $25K_1$: | registration command key |
| $25K_2$: | recording command key |
| $25K_3$: | stop command key |
| $25K_4$: | search command key |
| $25K_5$: | reproduction command key |
| $25K_6$: | increase command key |
| $25K_7$: | decrease command key |
| . | . |
| . | . |
| . | . |
| $25K_n$: | power source turn-on key |

The output video signal of the video output terminal $V_{OUT}$ and the output audio signal of the audio output terminal $A_{OUT}$ which are read out and obtained from the image memory 20 are supplied to a video monitor 26, so that a reproduction image of the VDR can be observed and listened. The above VDR, video camera 15, video monitor 17, VTR 18, and video monitor 26 are synchronized with each other by a sync signal system (not shown), respectively.

The operation of the system will now be described in detail hereinbelow with reference to FIGS. 2 and 3.

Figure 2:
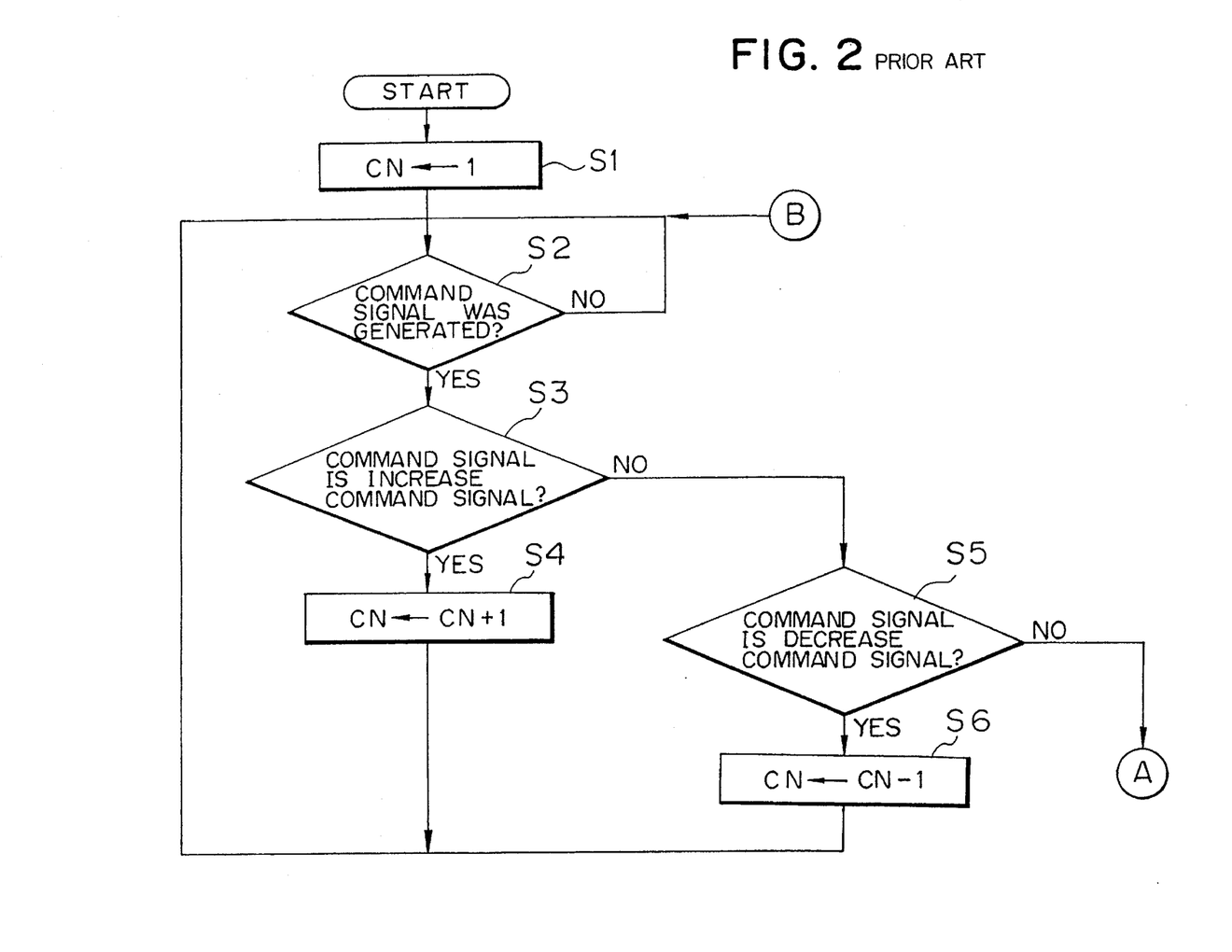
FIG. 2 is a first flowchart showing a processing procedure which is executed by a panel CPU 23 in the system of FIG. 1 in accordance with the operation of a panel 25.
Figure 3:
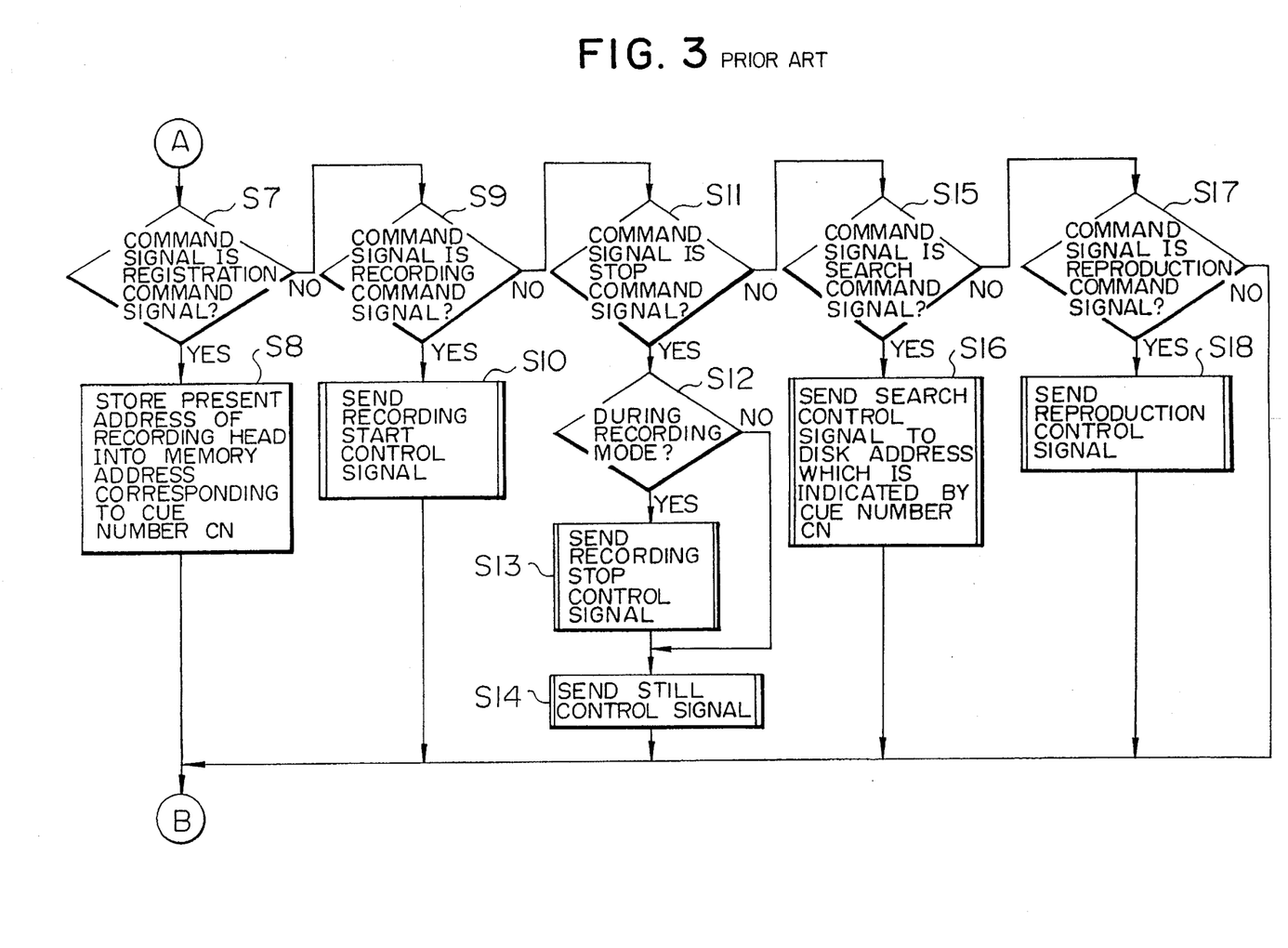
FIG. 3 is a second flowchart showing a processing procedure which is executed by the panel CPU 23 in the system of FIG. 1 in accordance with the operation of the panel 25.

FIGS. 2 and 3 are flowcharts showing processing procedures which are executed by the panel CPU 23 in accordance with the operation of the panel 25.

In FIGS. 2 and 3, the flowcharts are effective under a situation such that the video signal and audio signal which are generated from the video camera 15 have already sequentially recorded by the VTR 18 and supplied to the VDR. In step S1, the panel CPU 23 first stores "1" into a cue number register CN for initialization (hereinafter, such a process is expressed by "the cue number CN is set to 1"). The cue number is the number corresponding to each important scene (video image of a predetermined period of time) which is decided by the judgment of the user and should be recorded to the disk 11 among video images which are photographed by the video camera 15. The cue number CN is displayed to the display section 25D of a panel 25.

The CPU 23 subsequently discriminates whether some command signal has been generated from the panel 25 or not in step S2. When it is judged in step S2 that no command signal is generated, the processing routine does not progress to the subsequent step but the process in step S2 is repeated until some command signal is generated.

The cue number CN is arbitrarily set by operating the panel 25 by the user.

Namely, when the increase command key to increase the cue number by only "1" is depressed in the panel 25, the panel 25 supplies an increase command signal to the CPU 23. The CPU 23 advances from step S2 to step S3. In step S3, the CPU 23 discriminates that the command signal supplied in step S3 is the increase command signal, and step S4 follows. In step S4, the cue number CN is increased by only "1". On the other hand, when the decrease command key to decrease the cue number by only "1" is depressed in the panel 25, the panel 25 supplies a decrease command signal to the CPU 23. The CPU 23 advances from step S2 to step S5 through step S3. The CPU 23 judges that the command signal supplied in step S5 is the decrease command signal, so that step S6 follows and the cue number CN is decreased by only "1".

On the basis of the cue number CN which is set as mentioned above, the user operates the panel 25 as follows, so that only a desired scene can be simultaneously extracted and recorded while recording the relay video image by using the VDR.

That is, when the registration command key is depressed in the panel 25, the panel 25 supplies a registration command signal to the CPU 23 and the CPU 23 progresses to step S7 through steps S2, S3, and S5. The CPU 23 judges that the command signal supplied in step S7 is the registration command signal, so that step S8 follows. In step S8, the present address on the disk 11 of the head 13 is stored into a memory area that is indicated by the memory address corresponding to the cue number CN in the memory 24. The present address on the disk 11 of the head 13 is based on the address which has been preformatted on the disk and is obtained from the output read signal of the head 13 through the reproducing system 19 and the main CPU 21.

When the recording command key is depressed in the panel 25, the panel 25 supplies a recording command signal to the CPU 23. The CPU 23 advances to step S9 through steps S2, S3, S5, and S7. The CPU 23 judges that the command signal supplied in step S9 is the recording command signal, so that step S10 follows and a recording start control signal is sent to the main CPU 21. The main CPU 21 starts the recording operation to the disk 11 of the video signal and audio signal which are supplied from the video camera 15 in response to the recording start control signal. The recording operation is started from a disk address in which the head 13 is in a standby state. The VDR is set into the recording mode as mentioned above.

In the case where the recording command key is depressed immediately after the registration command key has been depressed, therefore, the disk address recorded in correspondence to the cue number CN is used as an initial point and the video signal and the audio signal are sequentially recorded.

When the stop command key is depressed in the panel 25, the panel 25 supplies a stop command signal to the CPU 23. The CPU 23 progresses to step S11 through steps S2, S3, S5, S7, and S9. The CPU 23 judges that the command signal supplied in step S11 is the stop command signal, so that step S12 follows and a check is made to see if the mode that is currently being executed is the recording mode or not. It is judged by a status signal from the main CPU 21. When it is judged in step S12 that the system is in the recording mode currently, step S13 follows and a recording stop control signal is sent to the main CPU 21. Further, step S14 follows and a still control signal is Sent to the main CPU 21. The main CPU 21 cancels the recording mode in response to the recording stop control signal. The main CPU 21 sets the head 13 into a standby state in the disk address at a time point when the recording mode is canceled. When it is judged that the system is not in the recording mode in step S12, the processing routine immediately advances to step S14 and the still control signal is sent to the main CPU 21. Since the recording/reproducing head 13 is in a search mode or a reproducing mode in this instance, the main CPU 21 sets the head 13 into a standby state in the disk address at a time point when the search mode or reproducing mode is canceled in response to the still control signal.

In the case, therefore, where after the registration command key has been depressed, the recording command key is immediately depressed and, after a little while, the stop command key is depressed, the recording/reproducing head 13 is set into a standby state in the disk address at a terminal point of the series of a video and audio signals which were sequentially recorded while using the disk address that is indicated by the cue number CN as an initial point in step S8. After completion of the operation in this case, when the increase command key is depressed and the cue number CN is increased by, for example, "1" and set and the registration, recording, and stop command keys are again sequentially depressed, in step S8, the disk address indicative of the terminal point of the series of video and audio signals which were recorded in correspondence to the cue number which had been set before is stored as a present address. The disk address, consequently, indicative of the initial point of the video and audio signals which are newly recorded is stored in correspondence to the cue number which has been set newly. As mentioned above, by sequentially depressing the registration, recording, and stop command keys each time the cue number is changed, the disk address indicative of the initial point of the series of video and audio signals of a predetermined period of time which correspond to the cue number and were recorded on the disk 11 is stored. In the depressing operation of the registration, recording, and stop command keys which is executed each time the cue number is changed, since the depression timings of the recording and stop command keys are arbitrary, the user can record a desired scene for only a desired time by depressing the recording and stop command keys at a proper timing while observing the video monitor 17. An individual cue number is allocated to each scene which is recorded.

When the search command key is depressed in the panel 25, the panel 25 supplies a search command signal to the CPU 23. The CPU 23 advances to step S15 through steps S2, S3, S5, S7, S9, and S11. The CPU 23 judges that the command signal supplied in step S15 is the search command signal, so that step S16 follows and a search control signal to search the head to the disk address stored in the memory area in the memory 24 which is indicated by the memory address corresponding to the cue number CN is sent to the main CPU 21. In response to the search control signal, the main CPU 21 executes the search operation to search the head to the disk address that is indicated by the cue number CN.

In the case, therefore, where after the registration command key has been depressed, the recording command key is immediately depressed and, after a little while, the stop command key is depressed and the search command key is further depressed, the recording/reproducing head 13 is moved to the disk address which is designated by the cue number CN as an initial point of the series of video and audio signals which were sequentially recorded. In such a search operation, the head is searched to the disk address which is indicated by the cue number CN which is preset. In the case where the search command is generated after the cue number has been changed as mentioned above, the head can be searched to the disk address corresponding to the changed cue number.

When the reproduction command key is depressed in the panel 25, the panel 25 supplies a reproduction command signal to the CPU 23. The CPU 23 advances to step S17 through the steps S2, S3, S5, S7, S9, S11, and S15. The CPU 23 judges that the command signal supplied in step S17 is the reproduction command signal, so that step S18 follows and the reproduction control signal is sent to the main CPU 21. In response to the reproduction control signal, the main CPU 21 starts the reproducing operation from the disk address in which the recording/reproducing head 13 is in a standby state.

In the case, therefore, where after the registration command key has been depressed, the recording command key is immediately depressed and, after a little while, the stop command key is depressed and the search command key is further depressed and, after completion of the search operation, the reproduction command key is depressed, the head is returned to the disk address which is indicated by the cue number CN as an initial point of the series of video and audio signals which were sequentially recorded and a replay operation is executed from such a disk address. The user, consequently, can observe the recorded scenes from the beginning and can confirm the scenes.

In the case where the user judges that the recorded scene is unnecessary during the confirmation, the user stops the stop command key and sets the cue number of the unnecessary scene and, after that, again depresses the search command key and, further, depresses the recording command key after completion of the search operation, so that new information can be overwritten to the unnecessary video and audio signals which have already been recorded by using the erasing/reproducing head 14 as mentioned above. The video and audio signals of the unnecessary scene, therefore, can be efficiently recorded without recording to the disk 11. In the case, on the other hand, where the user judges that the recorded scene is not unnecessary during the confirmation, the user depresses the stop command key and sets the new cue number and, after that, again depresses the search command key and depresses the recording command key at a desired timing after completion of the search operation, so that the next desired scene can be recorded subsequent to the video and audio signals of a predetermined period of time which were recorded in correspondence to the preset cue number.

In the method of selecting and recording only a desired scene while recording the relay video image to the master tape on the basis of the above processing routine as mentioned above, by using the VDR, a desired scene can be selected while confirming the relay video image. As compared with the method whereby after the master tape to record all of the relay video images has been previously formed, a desired scene is selected from the master tape, therefore, an editing operation amount for such a selection can be remarkably reduced.

As mentioned above, since various kinds of operation commands must be generated after setting the cue numbers as mentioned above, there is a problem that the operation becomes complicated. Particularly, it requires busy editing operations that the scenes recorded on the disk are confirmed once more by the user wherein the user generates the command for recording a desired scene to the disk while observing the relay video image that is currently in progress, and an extremely large operation load is imposed on the user.

An embodiment of the invention will now be described in detail hereinbelow with reference to the drawings.

Figure 4:
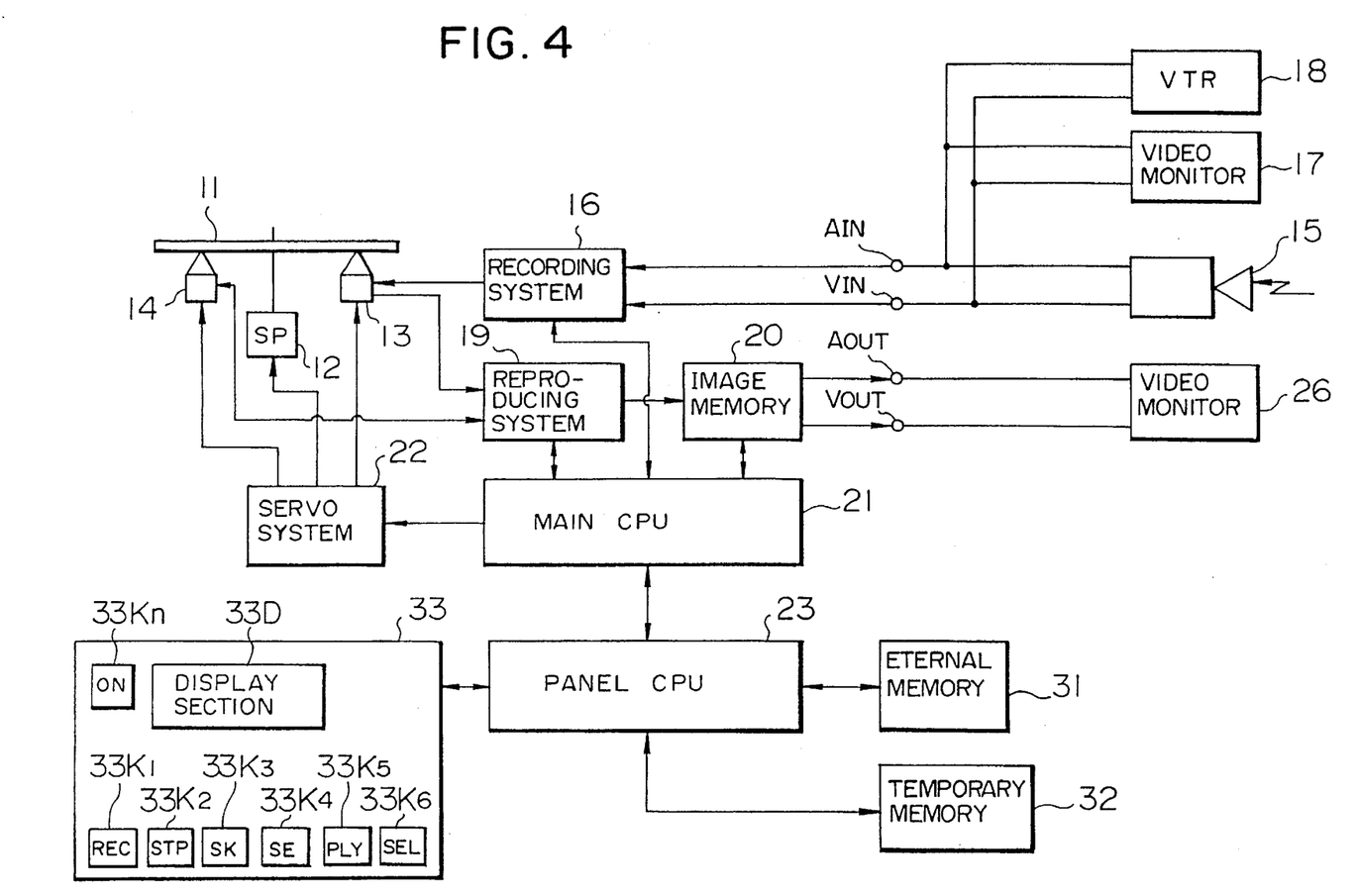
FIG. 4 is a block diagram showing a system which is constructed by a VDR and its peripheral apparatuses in order to realize a method of selecting a desired scene while recording relay video images in an embodiment according to the present invention.

FIG. 4 is a block diagram showing a system which is constructed by a VDR of an embodiment according to the present invention and its peripheral apparatuses and portions similar to those shown in FIG. 1 are designated by the same reference numerals.

In FIG. 4, the embodiment includes characteristic portions which will be described in the following.

Namely, the first characteristic portion relates to processes which are executed by the panel CPU 23. Such processes are executed as follows. Namely, programs based on flowcharts, which will be explained hereinafter, are stored in an ROM (not shown). The program information is read out from the ROM and stored into an RAM (not shown). The processes are executed on the basis of the program information stored in the RAM.

The second characteristic portion relates to a point that the panel CPU 23 has: an eternal memory (EM) 31 for storing the disk address indicative of the initial point of the scene in which the recording to the disk 11 has been determined; and a temporary memory (TM) for temporarily (on the processes) storing the disk address indicative of the initial point of the scene in which the recording to the disk 11 is not decided.

The panel CPU 23, further, decodes a command signal 33 from a panel 33 as an operating section of the system and supplies a control signal according to the result of the decoding to the main CPU 21. In addition to a display section 33D, however, the panel 33 is also provided with a plurality of command keys $33K_1$, $33K_2$, ..., $33K_n$ (n: the number of command keys) each for generating a corresponding command signal by being depressed. In the embodiment, the command keys are allocated as follows.

| | |
|---|---|
| $33K_1$: | recording command key |
| $33K_2$: | stop command key |
| $33K_3$: | skip command key |
| $33K_4$: | search command key |
| $33K_5$: | reproduction command key |
| $33K_6$: | selection recording mode command key |
| . | . |
| . | . |
| . | . |
| $33K_n$: | power source turn-on command key |

Among them, the skip command key $33K_3$ and the selection recording mode command key $33K_6$ relate to the third feature of the embodiment.

The operation of the system of the embodiment which is constructed as mentioned above will now be described in detail hereinbelow with reference to FIGS. 5 and 6.

Figure 5:
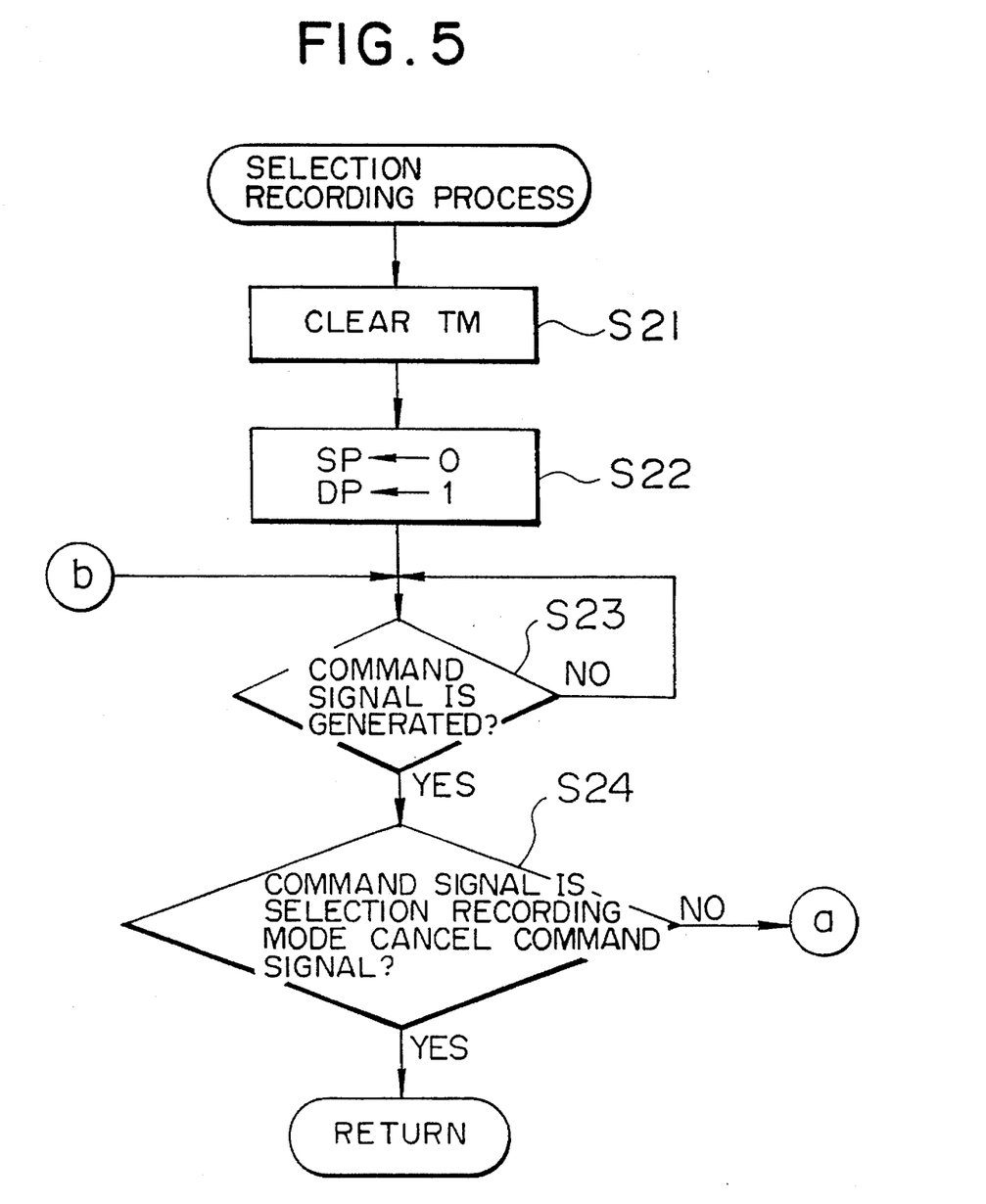
FIG. 5 is a first flowchart showing a processing procedure which is executed by the panel CPU 23 in the system of FIG. 4 in accordance with the operation of a panel 33.
Figure 6:
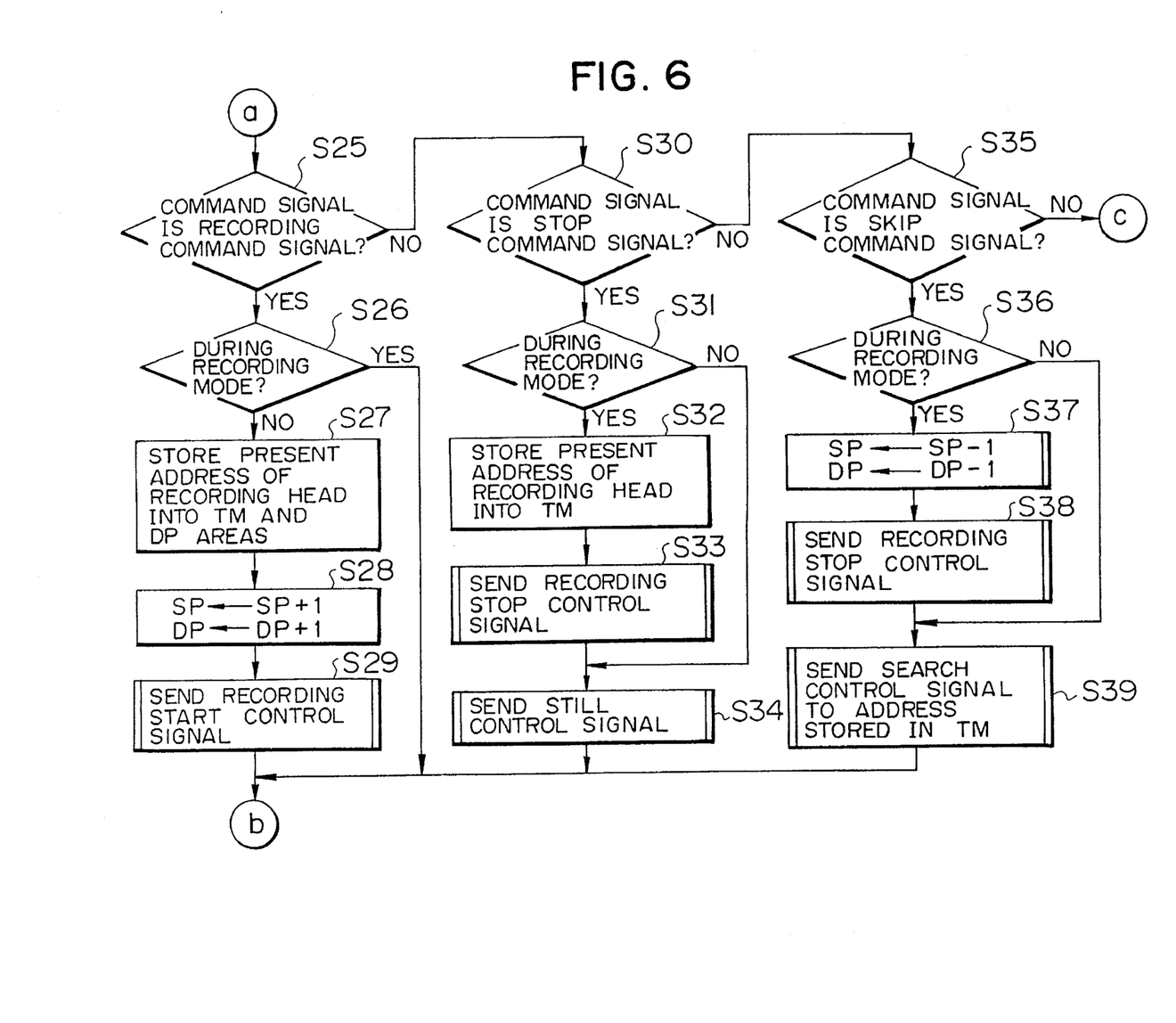
FIG. 6 is a second flowchart showing a processing procedure which is executed by the panel CPU 23 in the system of FIG. 4 in accordance with the operation of a panel 33.
Figure 7:
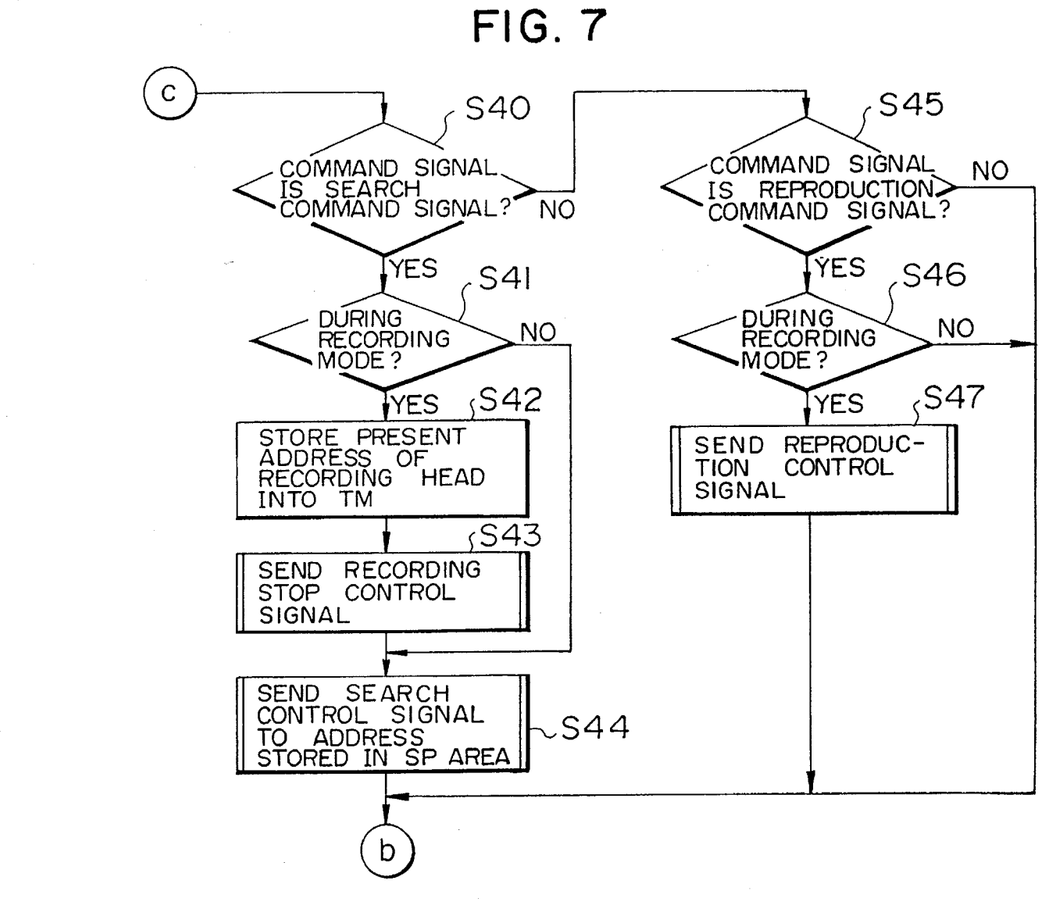
FIG. 7 is a third flowchart showing a processing procedure which is executed by the panel CPU 23 in the system of FIG. 4 in accordance with the operation of the panel 33.

FIGS. 5, 6, and 7 are flowcharts showing processing procedures which are executed by the panel CPU 23 in accordance with the operation of the panel 33.

In FIGS. 5 and 6, a processing routine according to the flowcharts are effective under a situation in which the video and audio signals which are generated from the video camera 15 have already sequentially been recorded by the VDR 18 and supplied to the VDR.

Under such a situation, when the selection recording mode command key in the panel 33 is depressed, the panel 33 supplies a selection recording mode start command signal to the panel CPU 23. The panel 23 advances to step S21 from a main routine (not shown) in response to the selection recording mode start command signal which is supplied. The panel CPU 23 clears the temporary memory 32 in step S21 and, further, progresses to step S22 and initializes a search area pointer SP and a drop area pointer DP in the eternal memory 31. The search area pointer SP indicates a memory area in the eternal memory 31 to store the address of the disk 11 which should be used as a target in the search operation by the depression of the search command key. The drop area pointer DP indicates the memory area next to the memory area in the eternal memory 31 which is indicated by the search area pointer SP. That is, each pointer is equivalent to the address in the eternal memory 31. As shown in step S22, accordingly, for example, when the search area pointer SP is initialized to 0, the drop area pointer DP is inevitably initialized to 1.

The panel CPU 23 subsequently discriminates to see if some command signal has been generated from the panel 33 or not in step S23. When it is judged in step S23 that no command signal is generated, step S23 is repeated until some command signal is generated without progressing to the subsequent steps.

When some command signal is generated in step S23, step S24 follows. A check is made to see if the generated command signal is a cancel command signal of the selection recording mode as a control mode of the processing routine or not. Such a cancel command signal is generated from the panel 33 when the selection recording mode command key is depressed during the execution of the control mode of the processing routine. In step S24, when the panel CPU 23 judges that the cancel command signal has been generated, the routine is finished and the processing routine is returned to the main routine. On the other hand, when it is judged that the cancel command signal has been generated, step S25 follows.

When the recording command key is depressed in the panel 33, the panel 33 supplies a recording command signal to the panel CPU 23. The panel CPU 23 progresses to step S25 through steps S23 and S24. The CPU 23 judges that the command signal supplied in step S25 is the recording command signal, so that step S26 follows and a check is made to see if the VDR is in the recording mode or not on the basis of a status signal from the main CPU 21. In step S26, when it is judged that the VDR is in the recording mode, step S23 immediately follows. In step S26, when it is judged that the VDR is not in the recording mode, step S27 follows. The present address on the disk 11 of the recording/reproducing head 13 is stored into the memory area (hereinafter, referred to as a DP area) which is indicated by the drop area pointer DP in the temporary memory 32 and eternal memory 31. The present address on the disk 11 of the head 13 is based on the address which has been preformatted on the disk and is obtained from the output read signal of the head 13 through the reproducing system 19 and main CPU 21. After step S27, the panel CPU 23 advances to step S28 and sends a recording start control signal to the main CPU 21. In response to the recording start control signal, the main CPU 21 starts the recording operation to the disk 11 of the video and audio signals which are supplied from the video camera 15. The recording operation is started from the disk addresses in which the head 13 is in a standby state. The VDR enters the recording mode in this manner.

When the stop command key is depressed in the panel 33, the panel 33 supplies a stop command signal to the panel CPU 23. The panel CPU 23 advances to step S30 through steps S23, S24, and S25. The panel CPU 23 judges that the command signal supplied in step S30 is the stop command signal, so that step S31 follows and a check is made to see if the mode which is at present being executed is the recording mode or not on the basis of the status signal from the main CPU 21. In step S31, when it is judged that the VDR is in the recording mode, step S32 follows and the present address on the disk 11 of the head 13 is stored into the temporary memory 32. The disk address indicative of the terminal point of the video and audio signals which were recorded in the recording mode is stored in this instance. After step S32, the processing routine advances to step S33 and a recording stop control signal is sent to the main CPU 21. In step S34, further, a still control signal is sent to the main CPU 21. In response to the recording stop control signal, the main CPU 21 cancels the recording mode. In response to the still control signal, further, the main CPU 21 sets the recording/reproducing head 13 into a standby state in the disk address at a time point when the recording mode is canceled. In step S31, on the other hand, when it is judged that the VDR is not in the recording mode, step S34 immediately follows and a still control signal is sent to the main CPU 21. In this instance, since the VDR is in the search mode or reproducing mode, the main CPU 21 sets the head 13 into a standby state in the disk address at a point in time when the search mode or reproducing mode is canceled in response to the still control signal.

When the skip command key as a feature of the embodiment is depressed in the panel 33, the panel 33 supplies a skip command signal to the panel CPU 23. The panel CPU 23 progresses to step S35 through steps S23, S24, S25, and S30. The panel CPU 23 judges that the command signal supplied in step S35 is the skip command signal, so that step S36 follows and a check is made to see if the mode that is at present being executed is the recording mode or not by the status signal from the main CPU 21. In step S36, when it is judged that the recording mode is at present being executed, step S37 follows and each of the search area pointer SP and the drop area pointer DP is decreased by "1". After step S37, step S38 follows and a recording stop control signal is sent to the main CPU 21. In step S39, further, a search control signal to search the head to the disk address stored in the temporary memory 32 is sent to the main CPU 21. In response to the recording stop control signal, the main CPU 21 cancels the recording mode. In response to the search control signal, further, the main CPU 21 executes the search operation to search the head to the disk address which is indicated by the temporary memory 32. In step S36, when it is judged that the mode is not the recording mode, step S39 immediately follows and the search control signal is sent to the main CPU 21.

When the search command key is depressed in the panel 33, the panel 33 supplies the search command signal to the panel CPU 23. The panel CPU 23 progresses to step S40 through steps S23, S24, S25, S30, and S35. The panel CPU 23 judges that the command signal supplied in step S40 is the search command signal, so that step S41 follows and a check is made to see if the mode that is at present being executed is the recording mode or not on the basis of the status signal from the main CPU 21. In step S41, when it is judged that the recording mode is being performed, step S42 follows and the present address on the disk 11 of the recording/reproducing head 13 is stored into the temporary memory 32. In this instance, the disk address indicative of the terminal point of the video and audio signals recorded in the recording mode is stored. After step S42, step S43 follows and the recording stop control signal is sent to the main CPU 21. Step S44 further follows and the search control signal to search the head to the disk address stored in the memory area (hereinafter, referred to as an SP area) which is indicated by the search area pointer SP is sent to the main CPU 21. The main CPU 21 cancels the recording mode in response to the recording stop control signal. In response to the search control signal, the main CPU 21 further executes the search operation to search the head to the disk address which is indicated by the search area pointer SP. In step S41, when it is judged that the mode is not the recording mode, step S44 soon follows and the search control signal is sent to the main CPU 21.

When the reproduction command key is depressed in the panel 33, the panel 33 supplies a reproduction command signal to the panel CPU 23. The panel CPU 23 advances to step S45 through steps S23, S24, S25, S30, S35, and S40. The CPU 23 judges that the command signal supplied in step S45 is the reproduction command signal, so that step S46 follows and a check is made to see if the mode that is at present being executed is the recording mode or not on the basis of the status signal from the main CPU 21. In step S46, when it is judged that the mode is not the recording mode, step S47 follows and a reproduction control signal is sent to the main CPU 21. In response to the reproduction control signal, the main CPU 21 starts the reproducing operation from the disk address in which the recording/reproducing head 13 is in the standby state.

The characteristic operations of the system of the embodiment which is accompanied by the above processing routine will now be described further in detail with reference to FIGS. 8 to 11.

Figure 8:
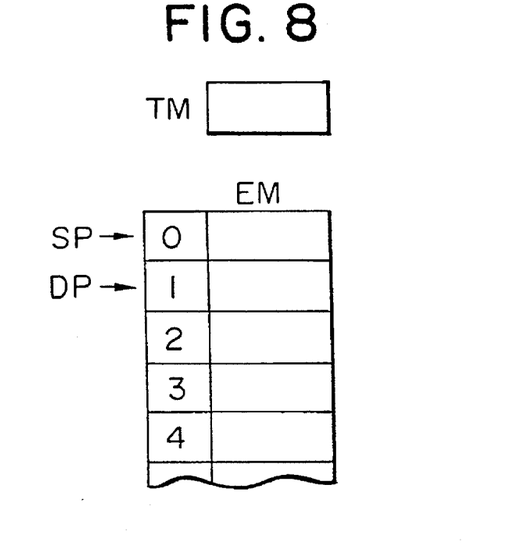
FIG. 8 is a diagram showing storing states of an eternal memory 31 and a temporary memory 32 in an initial state for explaining characteristic operations in the system of FIG. 4.

First, in the initial state just after a selection recording mode command has been generated, the temporary memory (TM) 32 is cleared as shown in FIG. 8 in step S21 and the search area pointer SP indicates the address "0" in the eternal memory (EM) 31 and the drop area pointer DP indicates the address "1" in the eternal memory 31 in step S22.

Figure 9:
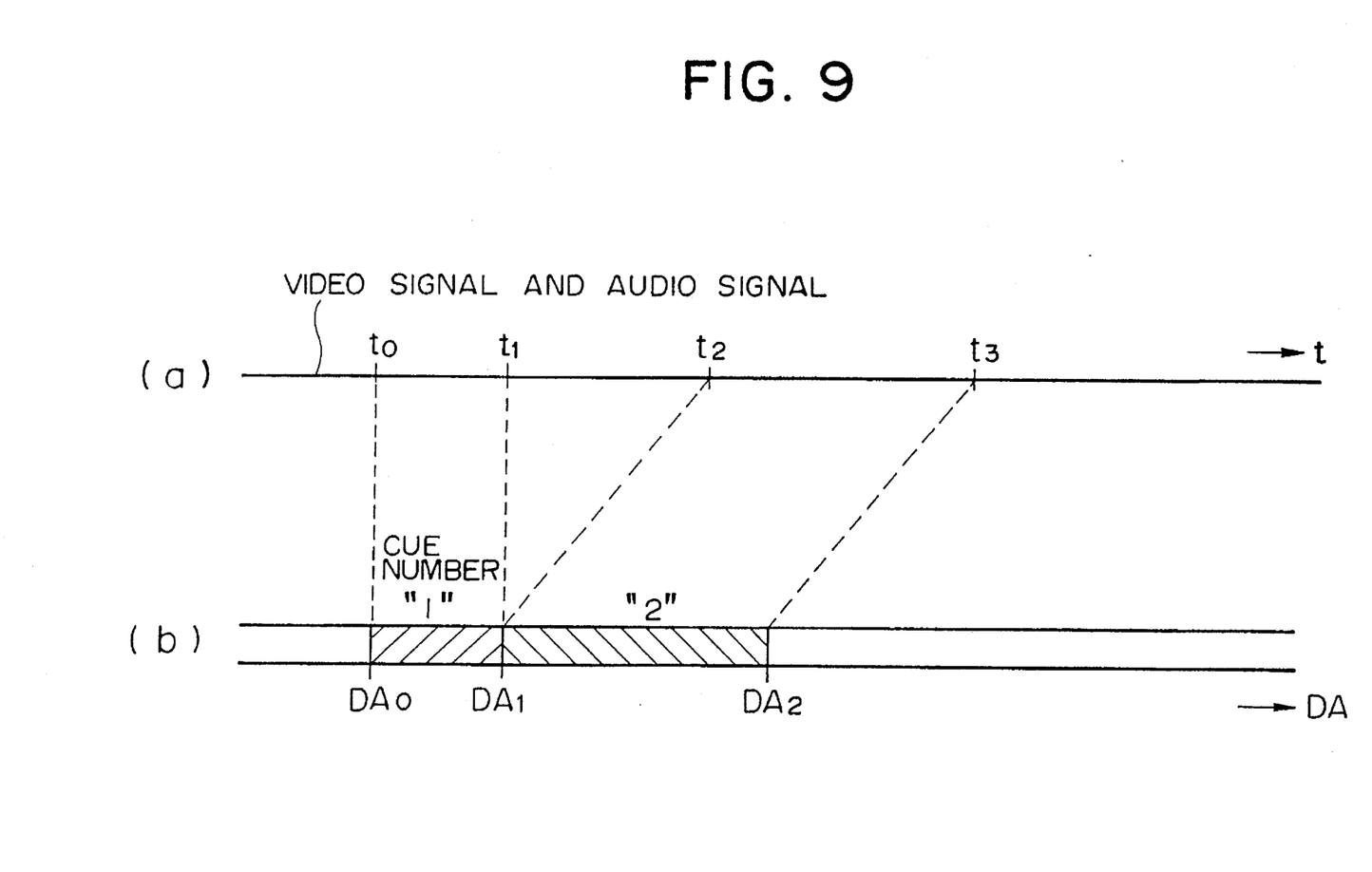
FIG. 9 is a diagram showing a recording state of a disk 11 for explaining characteristic operation in the system of FIG. 4.
Figure 10A:
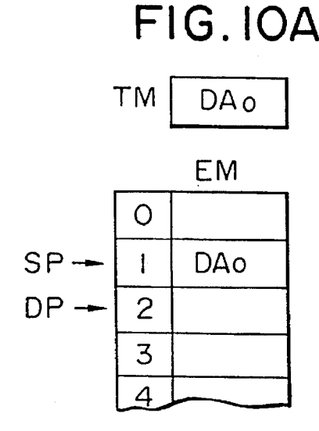
FIGS. 10A to 10E are diagrams showing storing states of the eternal memory 31 and temporary memory 32 in the case where various kinds of commands are generated, for explaining characteristic operations of the system of FIG. 4.

It is now assumed that the video signal and audio signal along a time base t have been supplied from the video camera 15 as shown in the section (a) of FIG. 9 and that the recording/reproducing head 13 has been set into the standby state in an address $DA_0$ of the disk 11 as shown in the section (b) of FIG. 9. In such a situation, when the user judges the start of a desired scene by observing the video monitor 17 from such an initial state and depresses the recording command key at time $t_0$, the panel CPU 23 stores the disk address $DA_0$ as a standby position of the head 13 at that time into the DP areas of the temporary memory TM and eternal memory EM in step S27. After that, each of the pointers SP and DP is increased by "1" in step S28. The memories TM and EM are, consequently, set into storing states as shown in FIG. 10A. In step S29, the recording operation to the disk 11 of the video signal and audio signal which are supplied from the video camera 15 is started.

Figure 10B:
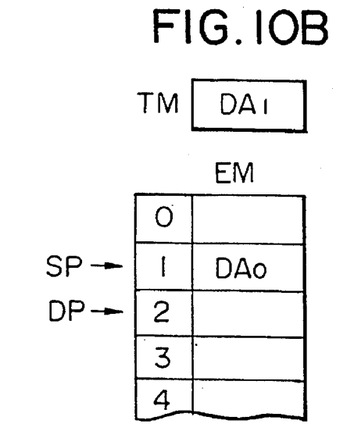

At time $t_1$ after a little while from time $t_0$, when the user judges the end of such a desired scene by observing the video monitor 17 and depresses the stop command key, the panel CPU 23 stores a disk address $DA_1$ as a present position of the head 13 at that time into the temporary memory TM in step S32. After that, the storing operation is stopped in step S33 and the recording/reproducing head 13 is set into a standby state at such a stop position (address $DA_1$) in step S34. The memories TM and EM are, consequently, set into a storing state as shown in FIG. 10B. The video signal and audio signal for a period of time from time $t_0$ to time $t_1$ are recorded to the disk 11 in correspondence to the address "1" in the eternal memory 31 for a time interval from the disk address $DA_0$ to $DA_1$. The address in the eternal memory 31, therefore, is set to the cue number "1" and the initial point information on the disk 11 of the recorded scene can be managed.

When the user immediately judges that the video and audio signals which were recorded for a period of time from time $t_0$ to $t_1$ should remain on the disk 11, he waits for the important scene to be recorded next without depressing the skip command key and search command key.

Figure 10C:
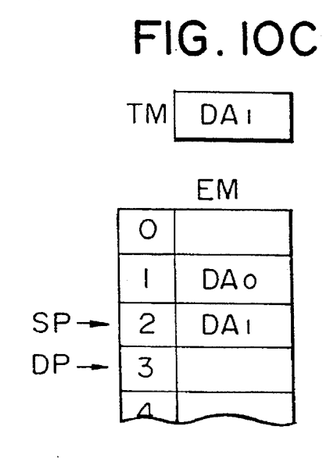

At time $t_2$ after the elapse of a little while from time $t_1$, when the user again judges the start of a desired scene by observing the video monitor 17 and subsequently depresses the recording command key at time $t_2$, the panel CPU 23 stores the disk address $DA_1$ as a standby position of the recording/reproducing head 13 at that time into the DP areas in the memories TM and EM in step S27. After that, each of the pointers SP and DP is increased by "1" in step S28. The memories TM and EM are, consequently, set into a storing state as shown in FIG. 10C. The recording operation to the disk 11 of the video and audio signals which are supplied from the video camera 15 is started in step S29.

Figure 10D:
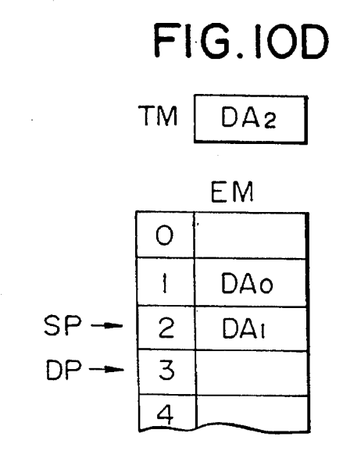

At time $t_3$ after the elapse of a little while from time $t_2$, when the user judges the end of the desired scene by observing the video monitor 17 and depresses the stop command key, the panel CPU 23 stores a disk address $DA_2$ as a present position of the head 13 at that time into the memory TM in step S32. After that, the storing operation is stopped in step S33 and the head 13 is set into a standby state at such a stop position (address $DA_2$) in step S34. The memories TM and EM are, consequently, set into a storing state as shown in FIG. 10D. The video signal and audio signal for a period of time from time $t_2$ to $t_3$ are recorded to the disk 11 in correspondence to the address "2" in the eternal memory 31 for a time interval from the disk address $DA_1$ to $DA_2$. The address in the eternal memory 31, therefore, is set to the cue number "2" and the initial point information on the disk 11 of the recorded scene can be managed.

Figure 11:
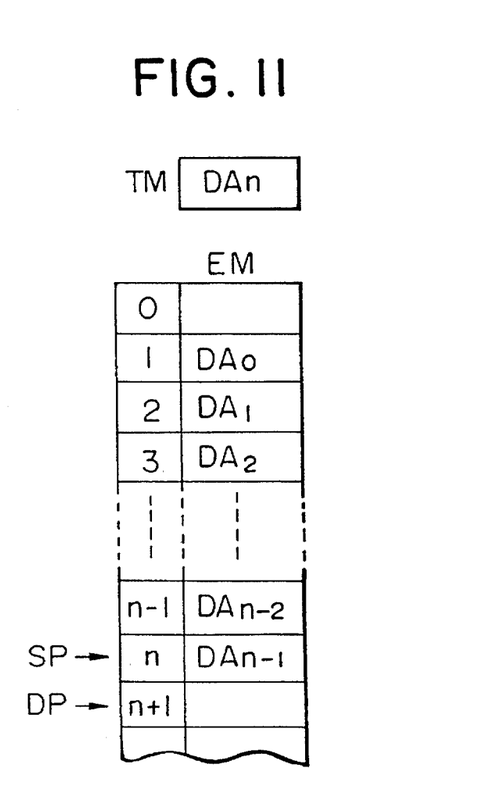
FIG. 11 is a diagram showing storing states of the eternal memory 31 and temporary memory 32 in the case where the selecting recording operations are progressed, for explaining characteristic operations of the system of FIG. 4.

The user repeats the operations such that he immediately judges whether the scene should be recorded or not every scene while observing the relay video image and that he alternately depresses the recording command key and the stop command key, so that the storing state of each of the memories TM and EM progresses as shown in FIG. 11.

On the other hand, in the case where just after time $t_3$, namely, after the stop command key has been depressed, the user judges that the video signal and audio signal should be replayed in order to confirm, for example, the recording state of the video and audio signals which were recorded for a period of time from time $t_2$ to $t_3$, the user depresses the search command key. The search command key is depressed after completion of the recording mode (in the non-recording mode). The panel CPU 23, in this case, reads out the disk address $DA_1$ stored in the SP area as shown in FIG. 10D in step S44 and allows the search operation for searching the head to the disk address $DA_1$ to be executed. After the recording command key has been depressed at time $t_2$, when the search command key is immediately depressed at time $t_3$ without depressing the stop command key, namely, even in the case where the search command key is depressed during the recording mode, the panel CPU 23 stores the disk address $DA_2$ as a present position on the disk of the recording/reproducing head 13 at the time of depression of the search command key into the memory TM in step S42. The panel CPU 23 stops the recording operation of the video and audio signals to the disk 11 in step S43, so that the memories TM and EM are also set into the storing state as shown in FIG. 10D. The panel CPU 23 likewise reads out the disk address $DA_1$ stored in the SP area as shown in FIG. 10D in step S44, thereby allowing the search operation for searching the head to the disk address $DA_1$ to be executed. When the search operation is finished, the head 13 is set into the standby state in the disk address $DA_1$.

When the search operation is finished, the user depresses the reproduction command key so as to replay the video signal and audio signal recorded to the disk 11 for a period of time from time $t_2$ to $t_3$ for confirmation. In response to the depression of the reproduction command key, the panel CPU 23 starts the reproducing operation from the standby position (address $DA_1$) of the head 13 in step S48.

The user observes the replay video image which is displayed on the video monitor 26 by the reproducing operation which has been started, thereby confirming the recording state of the video and audio signals of the scene recorded for a period of time from time $t_2$ to $t_3$.

In the case where during the replay operation, the user wants to stop the confirmation of the recording state of the relevant scene and to start the next recording by the video monitor 26, he depresses the skip command key. In response to the depression of the skip command key, the panel CPU 23 allows the search operation for searching the head to the disk address $DA_2$ stored in the memory TM as shown in FIG. 10D to be executed in step S39. Since the disk address $DA_2$ corresponds to the terminal point of the scene corresponding to the cue number "2", the next desired scene can be recorded from the initial point subsequent to the terminal point position because the next recording command is generated. As mentioned above, by generating the skip command even during the replay for judging whether the scene is an effective scene to be recorded to the disk 11, the recording/reproducing head 13 can be immediately moved to the recording start position on the disk 11 of the next desired scene.

Figure 10E:
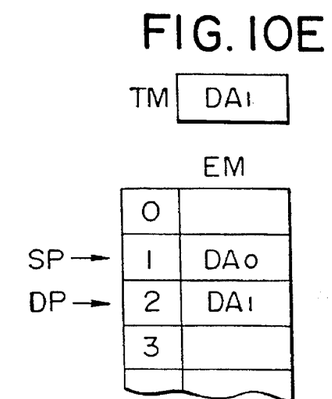

At time $t_3$, namely, during the progress of the recording mode which has been continued from time $t_2$, on the other hand, when the user judges that there is no need to leave the video and audio signals recorded so far to the disk 11 by observing the video monitor 17, he depressed the skip command key. In response to the depression of the skip command key, the panel CPU 23 decreases each of the search area pointer SP and the drop area pointer DP by "1" in step S37, thereby setting the memories TM and EM into the storing state as shown in FIG. 10E. The panel CPU 23, further, stops the recording operation to the disk 11 in step S38, reads out the disk address $DA_1$ stored in the memory TM as shown in FIG. 10E, and allows the search operation to the disk address $DA_1$ to be executed. After completion of the search operation, the head 13 is set into the standby state in the disk address $DA_1$. Since the disk address $DA_1$ corresponds to the initial point of the scene corresponding to the cue number "2", the next desired scene can be recorded subsequent to the initial point position because the recording command is generated next.

In the embodiment as mentioned above, the skip command is generated and during the recording mode, each pointer is decreased by "1" and the head 13 is immediately moved to the disk address of the initial point of the scene which has been recorded so far. In a mode other than the recording mode, the head 13 can be soon moved to the disk address of the terminal point of the scene which has been recorded just before. The editing operations for selecting and recording the desired scene among the relay video images from the video camera 15 can be very simply and promptly executed.

In the embodiment, two kinds of areas of the SP area and the DP area have been indicated in the eternal memory and the temporary memory area has been used in addition to the eternal memory. The invention, however, is not limited to such a construction but it is essentially sufficient that the disk address as initial point or terminal point information of the scene which has been determined so as to be left on the disk 11 and the disk address of the start time point of the recording mode when it is currently being executed can be individually stored.

As a disk address in the above embodiment, the address corresponding to the frame number of the video signal can be used.

As described in detail above, in the video disk recorder having the real-time editing function according to the present invention, in response to the generation of the recording command signal, the recording head is set into the recording mode and the disk address of the recording head at that time is stored as a determinate disk address. In response to the generation of the stop command signal, the recording mode is canceled and the disk address of the recording head at that time is stored as a temporary disk address. In the case where the skip command signal is generated during the recording mode, the recording head is moved to the determinate disk address stored at the time of the start of the recording mode. When the skip command signal is generated in the mode other than the recording mode, the recording head is moved to the temporary disk address. It is, consequently, possible to improve the operating efficiency to execute the busy editing operations such that the scene recorded on the disk is again confirmed while generating the command to record a desired scene to the disk while observing the relay video image that is at present being progressing. The operation load to the user can be reduced.

What is claimed is:

1. A video disk recorder having a real-time editing function, comprising:

recording means including moving means for moving a recording head in a radial direction of a re-recordable disk, for recording a video signal to said disk by said recording head;

reading means for reading an address on said disk of said recording head; and control means for performing operations of: setting, in response to a generation of a recording command signal, the recording head to a recording mode and storing said address as a determinate disk address; canceling, in response to a generation of a stop command signal, said recording mode and storing the address as a temporary disk address; in a case where a skip command signal is generated during the recording mode, moving the recording head to said determinate disk address stored at the time of a start of the recording mode; and in cases where the skip command signal is generated in modes other than the recording mode, moving the recording head to said temporary disk address.

2. A video disk recorder according to claim 1, wherein in a case where the skip command signal is generated during a reproducing mode which has been started from said determinate disk address, said control means moves said recording head to said temporary disk address.

* * * * *